United States Patent [19]

Koide

[11] Patent Number: 4,607,355

[45] Date of Patent: Aug. 19, 1986

[54] DRIVE SYSTEM

[75] Inventor: Hiroshi Koide, Kanagawa, Japan

[73] Assignee: Ricoh Company, Ltd., Japan

[21] Appl. No.: 546,499

[22] Filed: Oct. 28, 1983

[30] Foreign Application Priority Data

Oct. 28, 1982 [JP] Japan .................................. 57-189438

[51] Int. Cl.⁴ .............................................. G11B 7/00
[52] U.S. Cl. ...................................... 369/44; 369/98;
360/101; 360/75; 360/106
[58] Field of Search .................... 369/98, 32, 33, 43,
369/44, 50, 57, 56, 219, 215; 360/75, 77, 78,
101, 106; 318/696, 695, 138, 254; 74/25, 72

[56] References Cited

U.S. PATENT DOCUMENTS

| 4,340,949 | 7/1982 | Kelleher | 369/32 X |
| 4,481,613 | 11/1984 | Yokota | 369/44 X |
| 4,506,355 | 3/1985 | Dakin et al. | 369/32 |

Primary Examiner—Robert L. Richardson
Attorney, Agent, or Firm—Guy W. Shoup

[57] ABSTRACT

A drive system for use in an optical disk file device has a multipolar motor such as a three-phase linear DC motor for positionally controlling a read/write head and driving the same to track an optical disk. Selection of the coils of the motor and phase switching of the coils are stopped while the drive system is in the tracking mode.

5 Claims, 8 Drawing Figures

DIRECTION OF THRUST

DRIVE SYSTEM

BACKGROUND OF THE INVENTION

1. Field of the Invention

The present invention relates to an optical disk file device, and more particularly to a drive system used in such a device for controlling the position of a read/write head with respect to the optical disk and for driving the read/write head to track the optical disk.

2. Description of the Prior Art

Optical disk file devices have a read/write head for writing and reading information in and out of an optical disk by illuminating a light spot on a desired track on the optical disk, the track being more or less eccentric with respect to the disk. To align the light spot with the desired track, the read/write head is subjected to tracking operation which is carried out by drive means including an objective lens in the read/write head, which is movable radially across the optical disk. This drive system has been disadvantageous in that the movement of the objective lens results in a displaced optical axis of the optical system in the read/write head, and hence any tolerable degree of eccentricity of the tracks on the optical disk is reduced. The above difficulty would be eliminated by moving the overall head optical system, rather than the objective lens only, radially across the optical disk. This proposal however would still suffer from a drawback in that the weight of the entire movable mechanism would be large, and the tracking motor would be large in size. There has been adopted a system that has been studied at an early stage which includes a tracking motor doubling as an accessing motor for moving the read/write head to a position near a designated track. The motor employed comprises a voice-coil linear motor used in magnetic disk drives. This type of linear motor has stable controllability, but needs a large-size magnetic circuit. Such linear motors can be rendered smaller in size by having two-phase coils energizable with phase switching. The phase switching drive system includes a circuit for suppressing ripples in the motor thrust, but is unable to restrain instantaneous thrust variations occurring at the time of phase switching. When tracking happens to be effected simultaneously with phase switching, proper tracking with the accuracy on the order of submicrons is impossible to achieve due to such thrust variations. The phase switching drive system is costly to construct as the circuit for suppressing thrust ripples is generally complex in arrangement.

SUMMARY OF THE INVENTION

It is an object of the present invention to provide a drive system of a small size including a multipolar motor for controlling the position of a read/write head in an optical disk file device and driving the read/write head for tracking the optical disk.

Another object of the present invention is to provide a drive system for use in optical disk file devices which is capable of stably tracking the optical disk by stopping phase switching of the coils during the tracking mode.

Still another object of the present invention is to provide a drive system which has a simplified circuit arrangement and is of a low cost that are accomplished by not making any motor thrust correction.

According to the present invention, there is provided a drive system for use in an optical disk file device having a read/write head for reading and writing information from and in an optical disk, the drive system comprising a multipolar motor having a plurality of coils selectively energizable for positionally controlling the read/write head in a positional control mode and driving the same to track the optical disk in a tracking mode, and means for selecting and switching the phases of the coils of the motor in the positional control mode and for stopping the selection and phase switching of the coils in the tracking mode.

Since no phase switching is carried out in the tracking mode, disk tracking operation by the read/write head can be stabilized. The thrust of the motor is not corrected since if it were corrected without phase switching of the motor coils, the thrust correction would be in error. Therefore, the circuit arrangement for the drive system is simplified and less costly to construct. The motor is of a three-phase type or may be of more phases for a smaller size. An experiment has shown that the motor is subjected to thrust variations of 2% or less.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
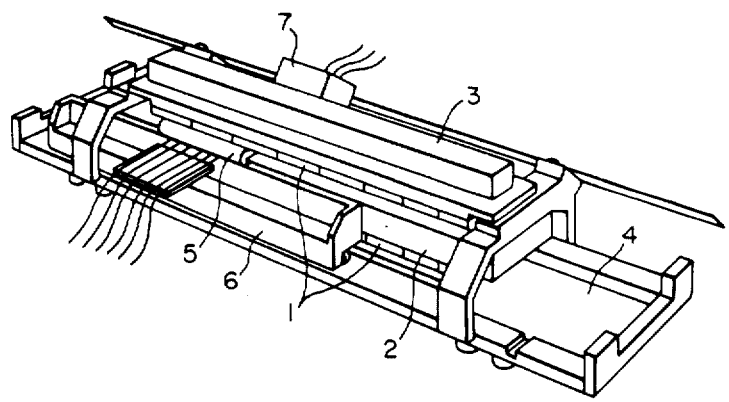
FIG. 1 is a perspective view of a three-phase linear DC motor.

FIG. 1 shows a three-phase DC linear motor comprising permanent magnets 1, an inner yoke 2, an outer yoke 3, a base 4 doubling as an outer yoke, a three-phase coil assembly 5, and a carriage 6. The motor also includes a position detector 7 for detecting the position of the carriage 6.

Figure 2:
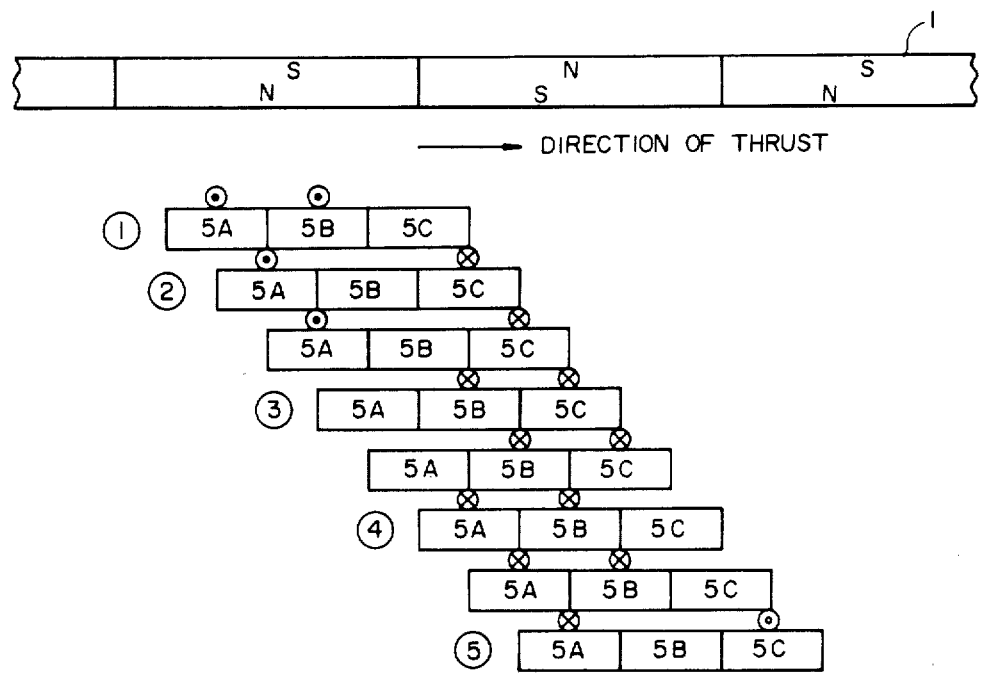
FIG. 2 is a diagram showing the relationship between the position of the carriage of the motor of FIG. 1 and current switching in the phases of the motor.

FIG. 2 illustrates the relationship between the position of the carriage 6 and current switching in the phases of the motor. When coils 5A, 5B, 5C of the coil assembly 5 are successively supplied with currents in the directions indicated by the symbols ⊙, ⊗ in the order of 1, 2, 3, . . . , the coils 5A, 5B, 5C and the carriage 6 on which they are mounted are subjected to a thrust in one direction by electromotive coaction between the coils 5A, 5B, 5C and the permament magnets 1.

The foregoing linear DC motor is employed in the present invention for driving a read/write head for tracking and accessing (positional control). Other multipolar motors such as arcuate or rotary brushless motors may also be used.

Figure 3:
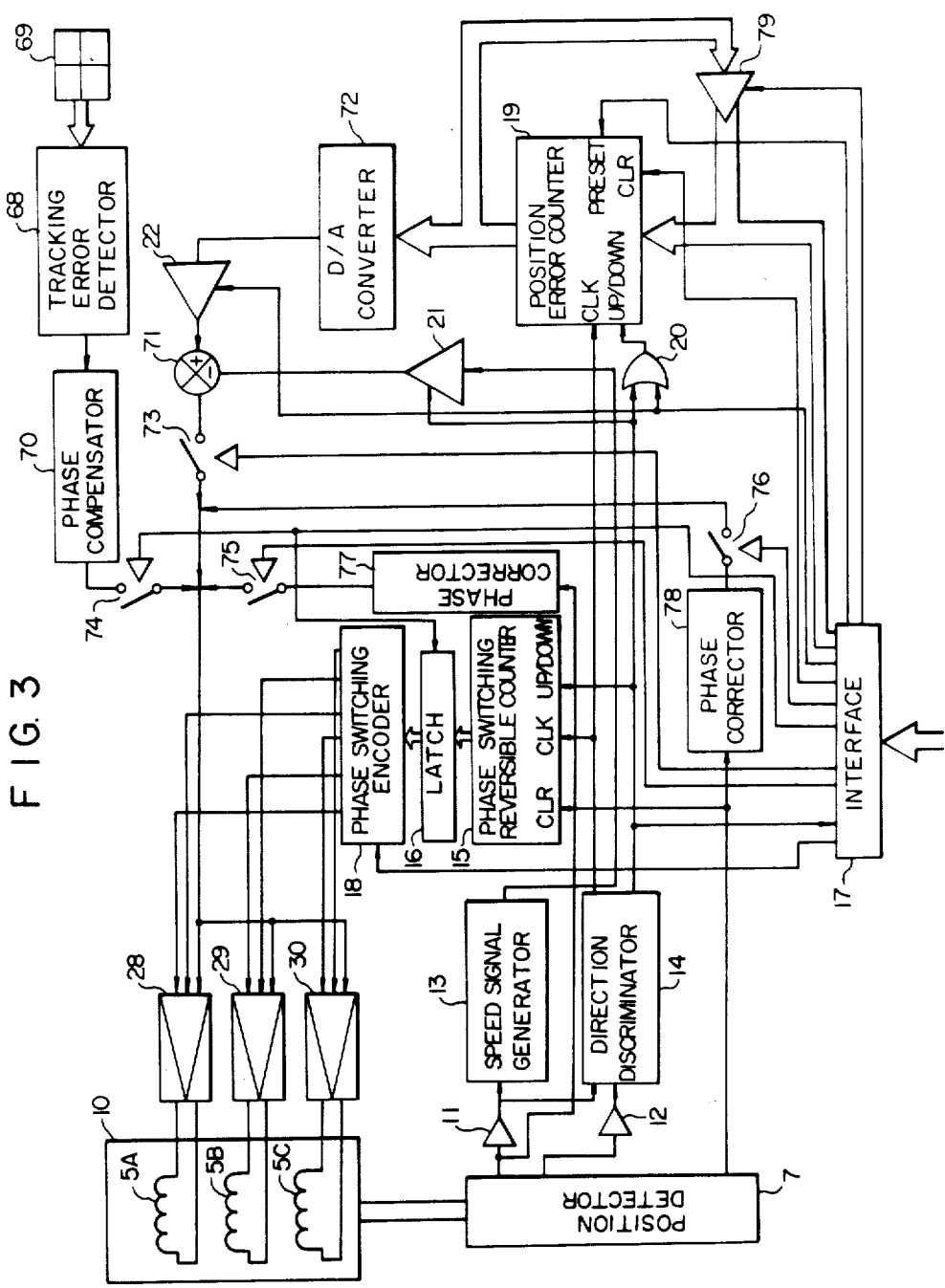
FIG. 3 is a block diagram of a drive system according to the present invention.

A drive system according to an embodiment of the present invention will be described with reference to FIG. 3. The three-phase linear DC motor, generally designated by the reference numeral 10, is used as an actuator in a read/write head positioning mechanism in an optical disk file device for positionally controlling the read/write head and driving the same for tracking an optical disk. The drive system includes the position detector 7 for generating a home signal when the carriage 6 is in an initial or starting position. As the carriage 6 moves along, the position detector 7 issues two sinusoidal position signals which are $\pi/2$ out of phase with each other. The two position signals are converted by comparators 11, 12, respectively, into binary digital waveforms. A speed signal generator 13 comprises a frequency-to-voltage converter for converting the frequency of the output from the comparator 11 into a speed signal voltage proportional to the speed of movement of the carriage 6. A direction discriminator 14 is responsive to the output signals from the comparators 11, 12 for determining whether the carriage 6 moves in one direction or the other and for issuing the result of direction determination as a direction-dependent signal and also issuing a clock signal as the carriage 6 travels.

The drive system also has a phase switching reversible counter 15 serving as an address counter for monitoring where the carriage 6 is positioned at all times. The phase switching reversible counter 15 is cleared by the home signal applied by the position detector 7 and incremented or decremented by the position-dependent signal supplied from the direction discriminator 14. A latch 16 is responsive to a signal delivered through an interface 17 from a microcomputer for latching the data from the phase switching reversible counter 15 when the read/write head starts tracking the optical disk or reaches a target positional accuracy for accessing operation. During tracking operation, the latch 16 prevents delivery of the latched data to a phase switching encoder 18 for stopping the phase switching of the currents flowing through the coils 5A, 5B, 5C of the motor 10. Otherwise, the latch 16 allows the data from the phase switching reversible counter 15 directly to the phase switching encoder 18. The phase switching encoder 18 issues an enable signal for determining which coils are to be supplied with currents based on the relationship between the position of the carriage 6 or the coil assembly 6 thereon and the polarities of the permanent magnets 1, and also a direction signal for determining the directions of the currents to be passed through the two selected coils so that a rightward thrust will be generated when a feedback control signal is positive under a normal condition and a leftward thrust will be produced when the feedback control signal is negative. The phase switching encoder 18 is energized in response to a motor enable signal fed through the interface 17 from the microcomputer for determining the enable signal and the direction signal based on the output signal from the latch 16, that is, based on the relationship between the polarities of the coils 5A, 5B, 5C and those of the permanent magnets 1, or the position of the coil assembly 5.

A position error detector 19 serves to count the difference between a target position and a current position of the carriage 6. The position error detector 19 is responsive to a preset signal for setting distance data delivered through the interface 17 from the microcomputer, the data being indicative of a distance between the current position and the target position. The position error detector 19 is incremented or decremented in response to the clock signal from the direction determinator 14 or an up/down input signal applied from an exclusive-OR gate 20. The exclusive-OR gate 20 is supplied with the direction-dependent signal fed from the direction discriminator 14 and an up/down command signal fed through the interface 17 from the microcomputer. When the carriage 6 moves to the right, for example, and the up/down command signal goes high with the direction-dependent signal being high, the exclusive-OR gate 20 produces an output signal of low level, so that the position error counter 19 operates in a decrement mode. When the carriage 6 moves to the left, the position error counter 19 also operates in a decrement mode. Thus, the position error counter 19 counts the difference between the target and current positions.

Figure 4A:
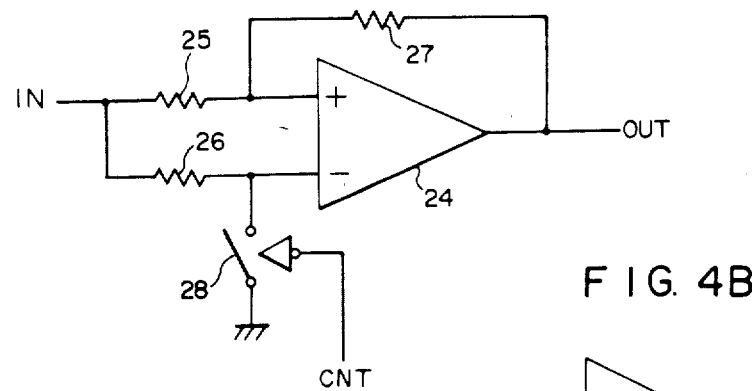
FIG. 4A is a circuit diagram, partly in block form, of an inverting/noninverting amplifier.
Figure 4B:
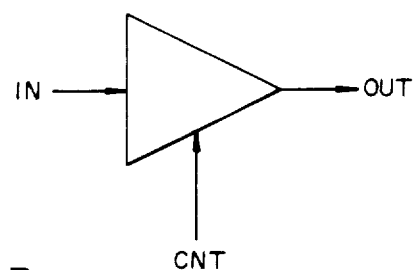
FIG. 4b is a block diagram of the reversible amplifier.

As illustrated in FIGS. 4A and 4B, each of inverting-/noninverting amplifiers 21, 22 comprises resistors 24, 25, 26 and a switching element 24 which is turned on and off in response to a control signal CNT which is the direction-dependent signal from the direction discriminator 14 or the up/down command signal from the interface 17, thereby turning the amplifier into an inverting or a noninverting amplifier.

Figure 5B:
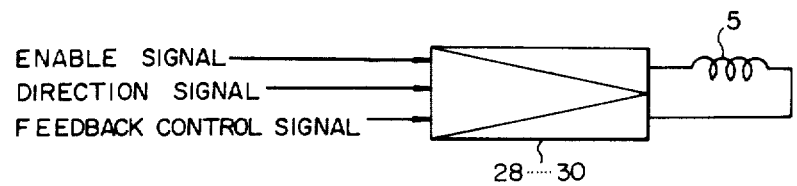
FIG. 5B is a block diagram of the servoamplifier.
Figure 5A:
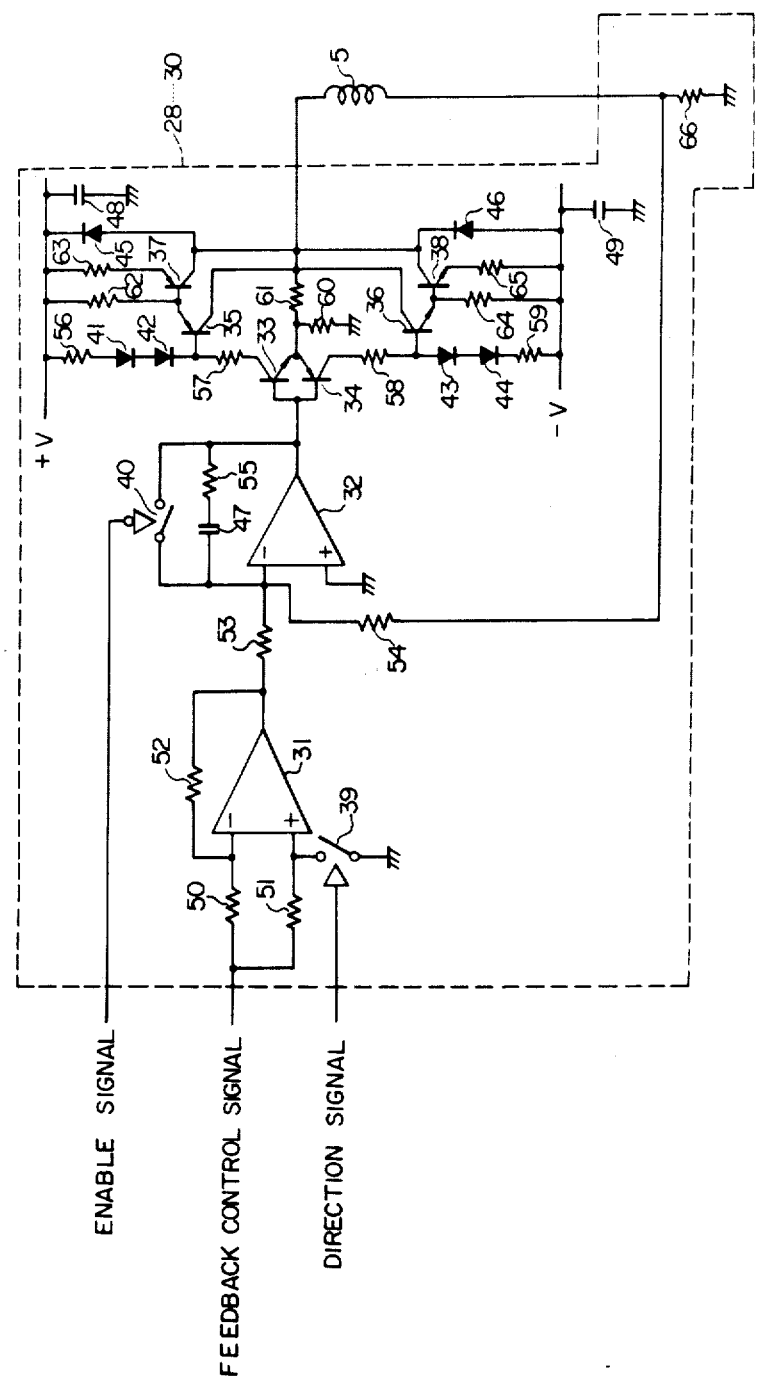
FIG. 5A is a circuit diagram, partly in block form, of a servoamplifier.

As shown in FIGS. 5A and 5B, each of servoamplifiers 28, 29, 30 comprises operational amplifiers 31, 32, transistors 33 through 38, switching elements 39, 40, diodes 41 through 46, capacitors 47 through 49, and resistors 50 through 66. When the enable signal goes low, the switching element 40 is turned on causing the servoamplifier to produce a zero output. When the switching element 39 is turned on and off by the direction signal, the servoamplifier determines the direction of a current to be passed through the coil assembly 5 of the motor 10 dependent on the feedback control signal.

A tracking error detector 68 (FIG. 3) serves to detect a tracking error based on a detected signal from an optical sensor 69 on the read/write head (mounted on a focusing drive system). The drive system further includes a phase compensator 70, a comparator 71, a digital-to-analog converter 72, switching elements 73 through 76, phase correctors 77, 78, and a bus buffer 79.

Figure 6:
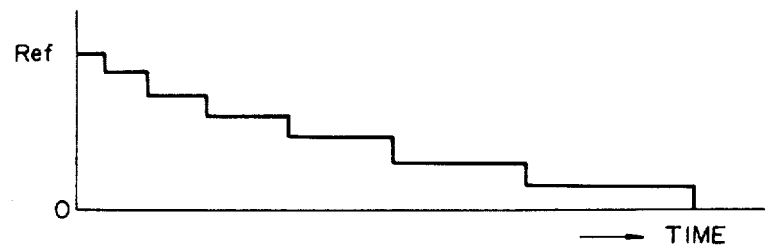
FIG. 6 is a diagram showing the waveform of a signal voltage in the drive system.

Operation of the drive system thus constructed is as follows:

It is assumed that the carriage 6 is at rest with the phase switching reversible counter 15 contains data indicative of a current position address. Data representative of a distance for the carriage 6 to move up to a target position is delivered from the microcomputer via the interface 17 and set in the position error counter 19. At the same time, the microcomputer turns on the switching element 73 and turns off the switching elements 74 through 76 via the interface 17. When the up/down command signal is positive, for example, the inverting/noninverting amplifier 22 operates as a noninverting amplifier. An output signal from the position error counter 19 is converted by the digital-to-analog converter 72 into a corresponding analog signal, which is applied through the then noninverting amplifier 22 to the comparator 71. The comparator 71 issues its output signal as a feedback control signal to the servoamplifiers 28 through 30, whereupon the coil assembly 5 in the motor 10 is supplied with currents to start moving the carriage 6 in one direction. While the carriage 6 is thus moving in one direction, the direction-dependent signal from the direction discriminator 14 is high, enabling the inverting/noninverting amplifier 21 to operate as a noninverting amplifier. A speed signal from the speed signal generator 13 is delivered as it is through the then noninverting amplifier 21 to the comparator 71. The signal from the amplifier 21 is subtracted from the output signal voltage Ref from the then noninverting amplifier 22. The drive system now operates in a speed control mode. As the carriage 6 moves, the data stored in the position error counter 19 approaches zero, so that the output signal voltage Ref also approaches zero as shown in FIG. 6. The speed of the carriage 6 now becomes lower as it moves toward the target position. During this operation, the phase switching reversible counter 15 indicating the current position also operates to deliver its data through the latch 16 to the phase switching encoder 18 for effecting phase switching. The microcomputer monitors the data in the position error counter 19 through the bus buffer 79 and the interface 17. As soon as the data in the position error counter 19 falls to zero, the microcomputer operates through the interface 17 to turn off the switching element 73 and turn on the switching element 75. Now, the drive system enters a position control mode in which the carriage 6 is positioned on the basis of an output signal from the position detector 7. More specifically, the carriage is controlled to be brought to a stop when the sinusoidal output signal of the position detector 7 which becomes alternately positive and negative will be of 0 volt. The output signal from the position detector 7 is applied through the phase corrector 77 to the servoamplifiers 28 through 30. When the carriage 6 is positioned in the target position, the microcomputer identifies the arrival of the carriage 6 at the target position by counting a certain period of time in the position control mode. Then, the microcomputer operates through the interface 17 to turn off the switching element 75 and turn on the switching element 74, and simultaneously to enable the latch 16 to latch the data from the phase switching reversible counter 15. Thereafter, the input to the phase switching encoder 18 remains unchanged, and the drive system is then in a tracking mode. In the tracking mode, an output signal from the tracking error detector 78 is applied through the phase compensator 70 to the servoamplifiers 28 through 30 for enabling the read/write head to track the optical disk. No phase switching is performed in this tracking mode.

In the foregoing embodiment, an arrangement may be made to effect no phase switching after the output from the position error counter 19 reaches zero. With this alternative, since no phase switching takes place during positioning, the carriage 6 can stably be positioned and thereafter can stably be driven for tracking the optical disk.

Although a certain preferred embodiment has been shown and described, it should be understood that many changes and modifications may be made therein without departing from the scope of the appended claims.

What is claimed is:

1. A drive system for use in an optical disk file device having a read/write head for reading and writing information from and onto a track of an optical disk, comprising:

(a) a multipolar motor having a plurality of coils each selectively energizable by a current signal of a selected phase direction, the phase directions of the current signals for said coils being switched in order to drive said read/write head to a target track location during a positioning mode, the phase switching of said coils being prevented when said read/write head is to be maintained at the target track location during a tracking mode;

(b) phase switching means for providing a phase switching signal for energizing said coils during said positioning mode;

(c) position error detecting means for detecting a difference in the position of said read/write head relative to the target track location and for providing an output when said read/write head has arrived at the target track location;

(d) tracking control means for providing tracking control signals without phase switching to said coils for maintaining said read/write head in the target track location during said tracking mode; and (e) switching means for switching the energizing of said coils from said phase switching means to said tracking control means in response to said output of said position error detecting means.

2. A drive system according to claim 1, further comprising latching means for preventing said phase switching signal from being provided to said coils for phase switching of said coils, said latching means being enabled by said switching means in response to said output of said position error detecting means.

3. A drive system according to claim 2, wherein said motor is a linear motor having a linear array of permanent magnets arranged for addressing the tracks of the optical disk and said coils are mounted on a carriage carrying said read/write head and adapted to be driven relative to said permanent magnets, said drive system further comprising a position detector for providing a signal indicating the position of said read/write head as it is driven across the tracks of the optical disk, said phase switching means including a phase switching reversible counter for maintaining an address count of the position of said read/write head based upon the output of said position detector and providing said phase switching signal for phase switching said coils in correspondence to the position of said read/write head as it is driven during the positioning mode, and a phase switching encoder for receiving said phase switching signal through said latching means and providing respective current signals of the corresponding phase directions to said coils.

4. A drive device according to claim 3, further comprising speed control means including a speed signal generator for converting said signal of said position detector into a speed voltage signal proportional to the speed of movement of said read/write head, a D/A converter for converting the output of said position error detecting means to a difference voltage signal corresponding to the detected position difference from the target track location, and a comparator for subtracting said speed voltage signal from said difference voltage signal to provide an output voltage level to said coils, so that said read/write head is driven at a progressively reduced speed as it approaches the target track location.

5. A drive device according to claim 4, further comprising second switching means for switching off said speed control means and switching on said signal of said position detector to energize said coils in a fine adjustment so as to bring said read/write head to an exact position in the target track location during a position control mode of a predetermined duration.

* * * * *